(12) United States Patent
Ilan et al.

(10) Patent No.: US 11,876,665 B2
(45) Date of Patent: Jan. 16, 2024

(54) FOCUSED ROOT CAUSE ANALYSIS

(71) Applicant: RADCOM LTD., Tel Aviv (IL)

(72) Inventors: Tomer Tuvia Ilan, Herzliya (IL); Ram Amit, Raanana (IL)

(73) Assignee: RADCOM LTD, Tel Aviv (IL)

( * ) Notice: Subject to any disclaimer, the term of this patent is extended or adjusted under 35 U.S.C. 154(b) by 0 days.

(21) Appl. No.: 17/510,425

(22) Filed: Oct. 26, 2021

(65) Prior Publication Data
US 2023/0129731 A1    Apr. 27, 2023

(51) Int. Cl.
*H04L 41/0631* (2022.01)
*G06F 9/50* (2006.01)

(52) U.S. Cl.
CPC ........ *H04L 41/0631* (2013.01); *G06F 9/5016* (2013.01)

(58) Field of Classification Search
CPC .......................... H04L 41/0631; G06F 9/5016
USPC ......................................................... 709/223
See application file for complete search history.

(56) References Cited

U.S. PATENT DOCUMENTS

| | | | | |
|---|---|---|---|---|
| 8,943,181 | B2 * | 1/2015 | Kasten | H04L 67/1021 709/219 |
| 9,612,899 | B2 * | 4/2017 | Della Corte | G06F 11/3006 |
| 10,445,738 | B1 * | 10/2019 | Waters | G06N 20/20 |
| 10,931,530 | B1 * | 2/2021 | Rzehak | H04L 45/02 |
| 11,087,409 | B1 * | 8/2021 | Bobley | G06V 30/224 |
| 11,138,055 | B1 * | 10/2021 | Chalfant | G06F 11/1048 |
| 11,269,859 | B1 * | 3/2022 | Luedtke | G06F 16/245 |
| 11,388,211 | B1 * | 7/2022 | Breeden | G06F 16/24568 |
| 11,411,804 | B1 * | 8/2022 | Goyal | G06F 16/2465 |
| 2013/0160070 | A1 * | 6/2013 | Ladd | H04L 41/06 725/129 |
| 2016/0057034 | A1 * | 2/2016 | Rosier | H04L 41/22 709/224 |
| 2016/0232566 | A1 * | 8/2016 | Bonalle | G06Q 30/0255 |
| 2016/0275495 | A1 * | 9/2016 | Sharan | G06Q 20/38 |
| 2017/0223030 | A1 * | 8/2017 | Merza | H04L 63/1416 |
| 2017/0272306 | A1 * | 9/2017 | Venkataraman | H04L 41/069 |
| 2017/0364534 | A1 * | 12/2017 | Zhang | G06F 16/284 |
| 2018/0004797 | A1 * | 1/2018 | Ghosh | G06F 16/2379 |
| 2018/0024901 | A1 * | 1/2018 | Tankersley | G06Q 10/06393 707/694 |
| 2018/0089328 | A1 * | 3/2018 | Bath | G06F 16/22 |
| 2018/0089601 | A1 * | 3/2018 | Link | G06F 40/205 |
| 2018/0102938 | A1 * | 4/2018 | Yoon | G06F 16/358 |
| 2018/0225653 | A1 * | 8/2018 | Vokes | G06Q 20/3265 |
| 2018/0276063 | A1 * | 9/2018 | Mendes | G06F 11/3409 |
| 2018/0349280 | A1 * | 12/2018 | Prasad | G06F 12/128 |
| 2019/0379595 | A1 * | 12/2019 | Ur | G06N 3/08 |
| 2020/0242616 | A1 * | 7/2020 | Waughtal | G06Q 20/3278 |

(Continued)

*Primary Examiner* — Melvin H Pollack
(74) *Attorney, Agent, or Firm* — A.C. Entis-IP Ltd; Allan C. Entis (57) ABSTRACT

A method of identifying anomalies characterizing failed transactions engaged in via a communications network, the method comprising: determining occurrence frequencies of fields and/or field values exhibited by the fields in successful transaction messages engaged in via the network; determining occurrence frequencies of fields and/or field values exhibited by the fields in messages of failed transactions engaged in via the network; and processing the occurrence frequencies to determine anomalous occurrence frequencies exhibited by the failed transactions.

20 Claims, 8 Drawing Sheets

(56) References Cited

U.S. PATENT DOCUMENTS

| | | | |
|---|---|---|---|
| 2020/0252317 A1* | 8/2020 | Westlin | H04L 41/0631 |
| 2020/0349133 A1* | 11/2020 | Dwarampudi | G06F 16/219 |
| 2021/0218704 A1* | 7/2021 | Shi | H04L 43/10 |
| 2021/0303381 A1* | 9/2021 | Baldassarre | G06F 11/008 |
| 2021/0359899 A1* | 11/2021 | Wang | H04L 41/0604 |
| 2021/0374153 A1* | 12/2021 | Saxena | G06F 11/0781 |
| 2021/0406896 A1* | 12/2021 | Chaturvedi | G06Q 20/405 |
| 2022/0116265 A1* | 4/2022 | Boyle, III | H04L 41/064 |
| 2022/0121628 A1* | 4/2022 | Devaraj | G06F 16/1824 |
| 2022/0147409 A1* | 5/2022 | Linck | G06F 18/217 |
| 2022/0159465 A1* | 5/2022 | Shrestha | H04W 12/0431 |
| 2022/0182278 A1* | 6/2022 | Vangapalli | H04L 67/30 |

\* cited by examiner

FOCUSED ROOT CAUSE ANALYSIS

FIELD

Embodiments of the invention relate to monitoring a communication network and identifying causes of failed transactions.

BACKGROUND

The virtual and bare-metal resources that populate the different communications networks that make up the internet and support today's global information system assume roles as clients and servers to share information via information exchanges referred to as transactions. Each transaction comprises a request message transmitted by a client to a server and a response message transmitted from the server to the client in response to the request message. The messages generally comprise blocks of data fields formatted in accordance with any of various protocols that both the client and server may use to communicate with each other to engage in a transaction.

For example, the global information system referred to as the World Wide Web (W3) that provides access to information of all kinds, operates to communicate information over the internet between web clients and web servers via interactions comprising request and response messages formatted in accordance with a Hypertext Transfer Protocol (HTTP). Two versions of HTTP are currently in common use, HTTP/1, and HTTP/2, optionally generically referenced as HTTP. HTTP/1 and HTTP/2 share the same semantics. However, whereas HTTP/1 encodes messages in plain text, HTTP2 comprises a binary framing layer that compresses data in HTTP messages and configures the messages in binary coded fields encapsulated in HTTP/2 frames. HTTP/2 coding enables full multiplexing of messages from different transaction streams.

HTTP/1 request messages comprise a start line, an optional header, and an optional body. The start line of a request message comprises data fields that inform a web server to which the request is sent of a task, referred to as a HTTP/1 method, typically used to define a type of transaction to which the request message belongs, that the web client desires to have implemented and a target resource, usually a URL or URI, to which the request is targeted. The optional request header is fully extensible and may comprise any number of various different types of HTTP/1 header data fields with no particular order in which they are required to be presented in the header. The optional request body may comprise any types and amounts of data relevant to the request and may for example comprise text, images, videos, audio tracks, and/or software applications.

HTTP/1 response messages have a format similar to that of request messages. However, instead of beginning with a start line, response messages begin with a status line, which is followed by an optional header and optional body. The status line of a response message to a given request message comprises an HTTP/1 status code that indicates what happened to the request message. Each HTTP/1 status code is a three digit number that begins with a most significant digit 1, 2, 3, 4, or 5 that indicates one of five different classes of statuses. The two digits following the most significant digit indicate a different species of status belonging to the status class that is represented by the most significant digit. Status codes beginning with 1 indicate that the server has received and understood the request message and that the message is being processed under certain conditions or requirements indicated by the digits following 1. Status codes beginning with 2 indicate various types of successful processing of the request message and that any requested information is found in the response message body. Status codes beginning with 3 indicate that the client must take an additional action, typically a URL redirection, to complete the request. Status codes beginning with 4 are error codes that indicate that the request message is compromised by one of a different set of errors that prevents the server from successfully responding to the request message. Status codes beginning with 5 indicate a server error that prevents the server from successfully responding to the request message.

Whereas transaction error codes of protocols used to configure transactions, such as the HTTP/1 error codes discussed above or an expanded set of error codes used by HTTP/2, provide information of types of errors that generate failures of transactions, transaction messages are complex transmissions that are difficult to process to determine root causes of the errors. For example, the fully extensible nature of HTTP message codes, the lack of any constraint on an order in which header and body data fields are presented, allowance of inclusion of different and ad-hoc data fields in a request message, render information provided by HTTP error codes insufficient to support efficient determination of root causes of transaction failures. In general, identification of transaction error root causes presently requires substantial investment of human resources.

An enormous volume of information is currently transmitted day and night over the internet and constituent communications networks via HTTP web transactions and transactions formatted in accordance with other protocols between clients and servers that may be located anywhere on the planet. With the advent of advanced 5G communications technologies that are spawning new forms of communications activities such as the internet of things (IoT) and machine to machine (M2M) communications, the volume of transactions is growing and is expected to continue growing at an enormous pace. Since features that characterize HTTP transactions and error codes similarly characterize transactions and error codes provided by other communications protocols the new communications technologies are expected to exacerbate the challenges and complexities of determining route causes for failed transactions.

SUMMARY

An aspect of an embodiment of the disclosure relates to providing methods that are advantageous for automatically identifying root causes of failures of transactions engaged in via a communications network.

In an embodiment the method comprises sampling transaction packets propagated over the network to determine frequencies of occurrence of data fields and/or their respective field values in requests and/or responses of the transactions that are successful and frequencies of occurrence of data fields and/or their respective field values in requests and/or responses of the transactions that fail. Occurrence frequencies for a field or field value found in successful transactions may be referred to as "normative occurrence frequencies. Occurrence frequencies for a field or field value found in failed transactions may be referred to as anomalous occurrence frequencies. The determined normative and anomalous occurrence frequencies are used to determine which fields and/or field values exhibit an occurrence frequency in the successful transactions that is statistically significantly different from an occurrence frequency of the fields and/or field values in the failed transactions to indicate when they appear in a failed transaction that they reasonably may be associated with a root cause of the transaction failure. A field and/or field value that exhibits such a statistically significant difference between normative and anomalous occurrence frequencies may be referred to respectively as a marker field and/or marker field value. Occurrence frequencies of marker fields and marker field values may be referred to as marker frequencies.

In accordance with an embodiment when a transaction propagated over a network fails, a marker field and/or marker field value associated with the transaction is automatically identified and provided to an entity monitoring traffic over the network to aid in determining a root cause of the error that caused the failure. Marker fields and/or marker field values may be determined for transactions propagated over a network as functions of protocols used to format the transactions, transaction types, and/or error codes that the protocols use to indicate occurrences of errors in the transactions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. The phrase "in an embodiment", whether or not associated with a permissive, such as "may", "optionally", or "by way of example", is used to introduce for consideration an example, but not necessarily a required configuration of possible embodiments of the disclosure. Unless otherwise indicated, the word "or" in the description and claims is considered to be the inclusive "or" rather than the exclusive or, and indicates at least one of, or any combination of more than one of items it conjoins.

Figure 1A:
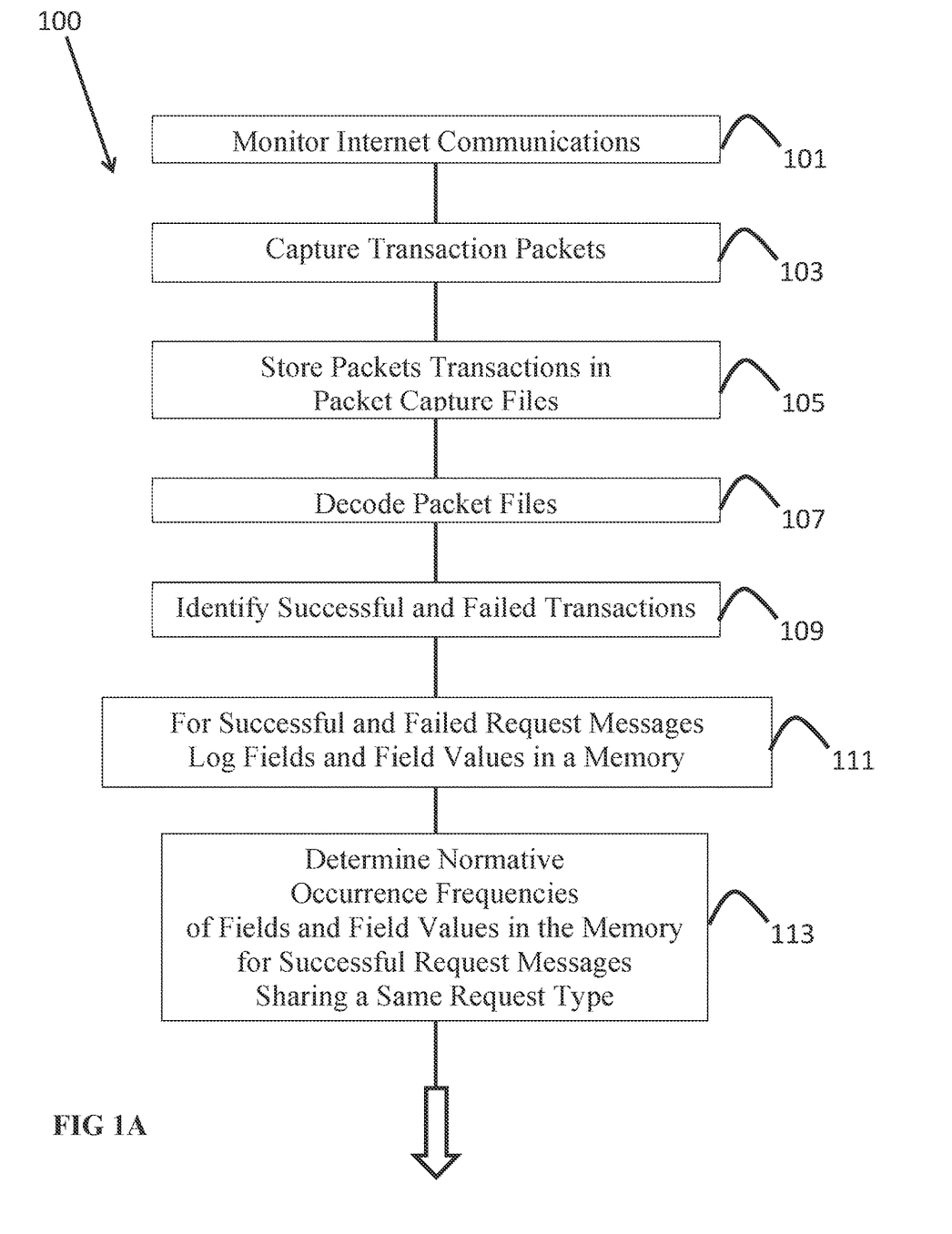
FIGS. 1A and 1B schematically shows a flow diagram for determining marker fields and/or marker field values for transactions propagated over a communications network, in accordance with an embodiment of the disclosure.
Figure 1B:
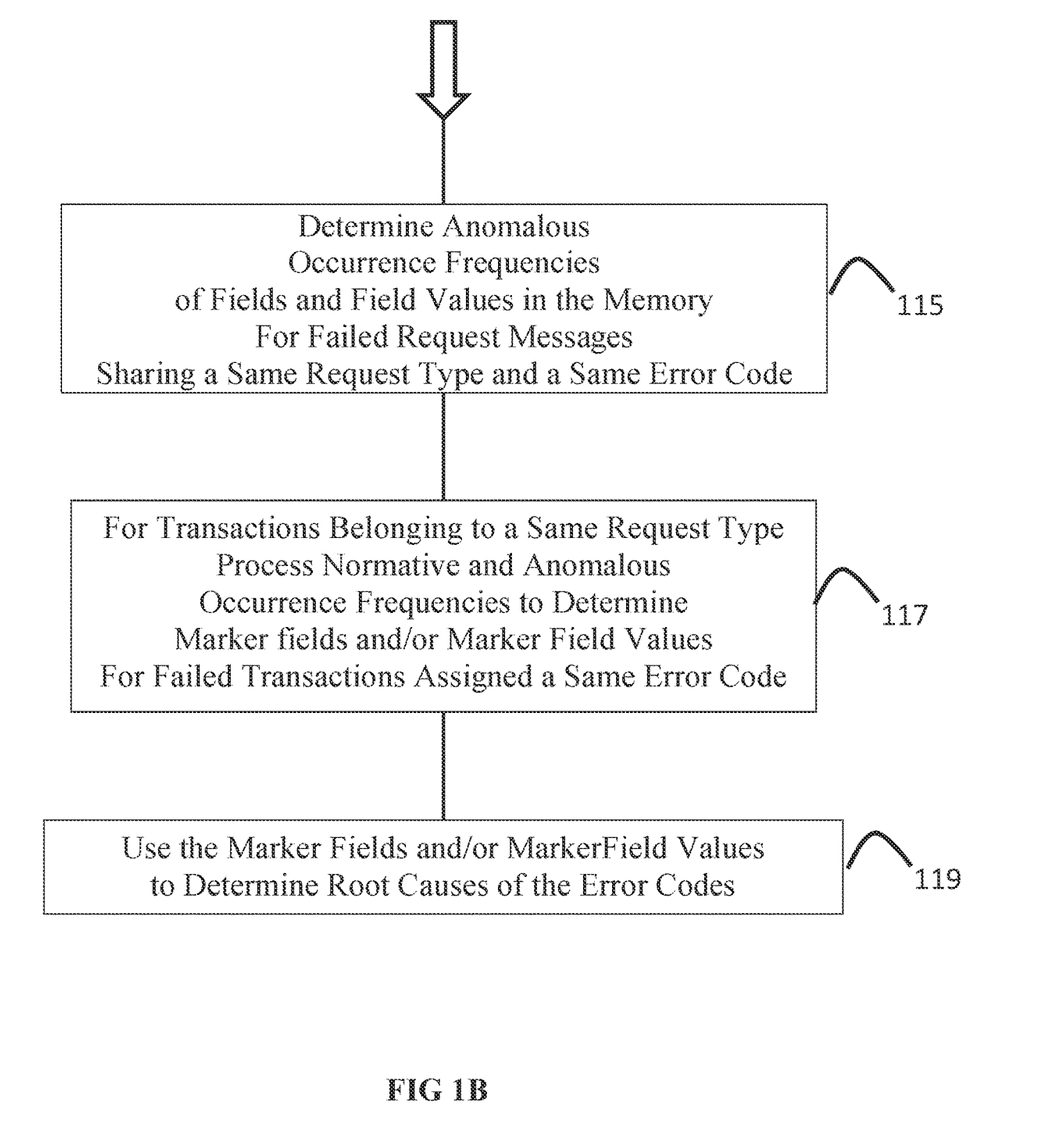

FIGS. 1A and 1B show a flow diagram 100 of a process, also referenced by the numeral 100, that may be used to determine marker fields and marker field values for transactions engaged in between clients and servers via a communications network, in accordance with an embodiment of the disclosure. In accordance with an embodiment the transactions may be configured using any of various protocols that the network may support. By way of example, a transaction may be configured in accordance with any mobile or fixed network protocol such as by way of example a 5G Core, LTE/EPC, IMS, and/or an application layer protocol. Process 100 may be encoded in executable instructions and executed by any combination of virtual and/or bare-metal processing and memory resources, hereinafter optionally referred to as a root cause sleuth (ROCAUS), storing and/or having access to the instructions and communications propagated over a communications network.

In a block 101 ROCAUS optionally monitors communications propagated over the network to identify transactions supported by the network, and in a block 103 captures transaction packets belonging to the transactions. In a block 105 ROCAUS stores the captured packets in packet capture files residing in a memory (not shown), and optionally in a block 107 decodes the captured packets and identifies protocols used to configure the transactions to which the packets belong. Optionally, in a block 109 ROCAUS, processes the decoded packets to identify packets configured in accordance with a same protocol that belong to successful transactions and packets that belong to failed transactions. In a block 111 ROCAUS logs in a memory data identifying fields in the packets of request messages belonging to the successful and failed transactions and for each identified field, a value that the field exhibits.

In a block 113 ROCAUS processes the logged data to determine for identified fields in successful transactions that are associated with a same type of request message, normative occurrence frequencies of the identified fields and/or their respective values. And optionally in a block 115 ROCAUS processes the logged data to determine for identified fields in failed transactions that are associated with a same type of request message and a same error code alerting to the failure of the transactions, anomalous occurrence frequencies of the fields and/or their respective values. In an embodiment a particular field value may refer to the actual field value or for a range, or "bin", of field values to which the particular field value is binned.

Optionally in a block 117 ROCAUS processes normative and anomalous occurrence frequencies for a same protocol, same transaction type, and/or same error code transmitted to indicate failure, to determine marker frequencies and associated respective marker fields and/or marker field values for the transactions. In an embodiment determining a marker field or field value for a transaction type comprises determining which fields and/or field values that appear in the transaction type exhibit a statistically significant difference between normative and anomalous occurrence frequencies and using such fields and/or field values as marker fields and/or marker field values respectively. Optionally, a difference is considered statistically significant if the difference is greater than a sum of twice the standard deviation estimated for the normative occurrence frequency plus twice the standard deviation estimated for the anomalous occurrence frequency.

In a block 119 ROCAUS uses the marker fields and/or marker field values to determine root causes for failures of transactions. In an embodiment, in the event of a transaction failure using a marker field and/or marker field value to determine a root cause for the failure comprises transmitting the identity of the field marker and/or marker field value to an entity that operates to monitor and/or maintain quality of service of the network to use the marker and/or marker field to determine the root cause.

By way of example FIGS. 2A-3C schematically show simulated histograms optionally determined by ROCAUS that exhibit occurrence frequencies for successful and failed transactions which are engaged in between clients and servers via a communications network, in accordance with an embodiment of the disclosure.

Figure 2A:
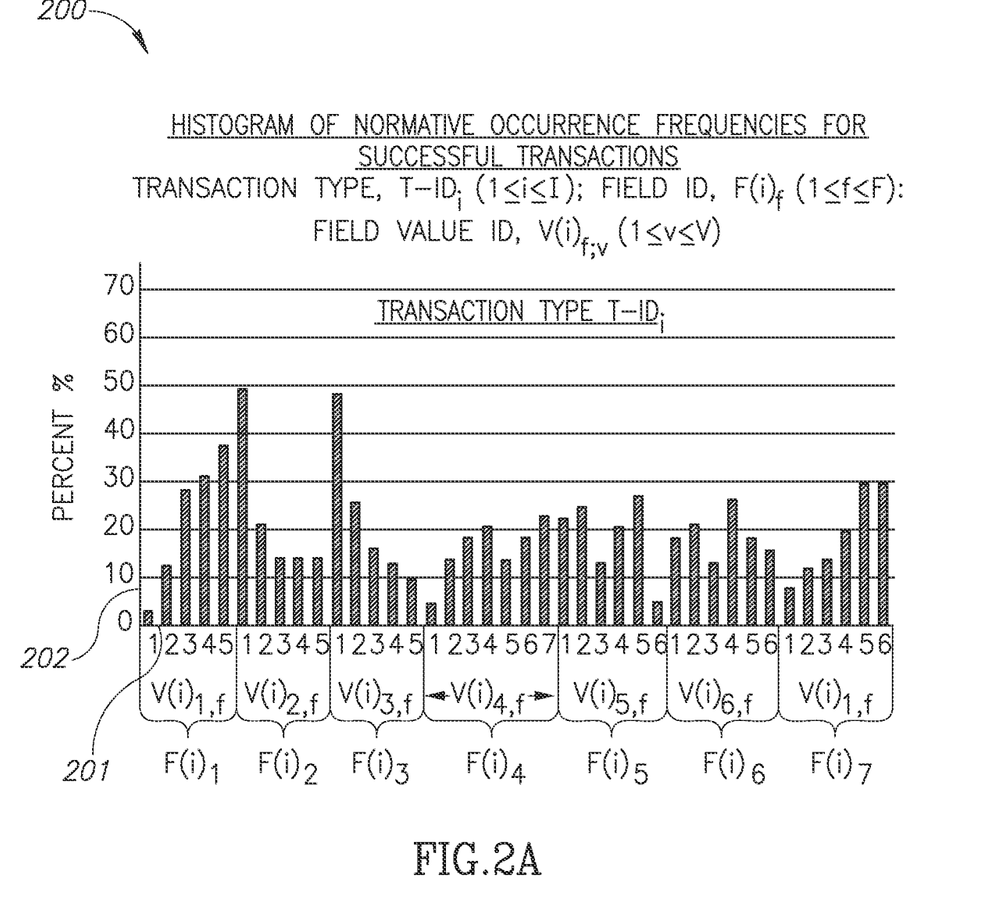
FIG. 2A schematically shows a simulated "normative" histogram of normative occurrence frequencies of field values for a given protocol, transaction type, and different fields comprised in response messages of successful transactions propagated over a network, in accordance with an embodiment of the disclosure.

FIG. 2A shows a simulated normative histogram 200 of normative occurrence frequencies for successful transactions engaged in over the network that are configured in accordance with any given protocol that may be supported by the network, for example an HTTP/1, HTTP/2, 5GC-NAS, Diameter, Radius, SIP, or DNS protocol. Transactions configured in accordance with the protocol of a particular transaction type are identified by an index, "i", of an identifier $T\text{-}ID_i$ ($1 \leq i \leq I$), where I represents a number of different transaction types enabled by the protocol. Fields in a request message of a transaction $T\text{-}ID_i$ are represented by an identifier $F(i)_f$ ($1 \leq f \leq F$) where the subscript, "f", indicates a particular field of a total number of F possible fields. Values that a particular field $F(i)_f$ may assume are represented by $V(i)_{f,v}$ ($1 \leq v \leq V$) where the index, "v", represents a particular value, or bin of values, of a total number of V possible different values that the field $F(i)_f$ may assume.

In normative histogram 200, for conveneance of presentation it is assumed that for the given type transaction $T\text{-}ID_i$ that is the subject of the histogram there are only 7 fields and each of the field has a total number of between 5 and 7 possible field values. In practice a number of fields may be many more than 7 and may for example be as many as 100 or more possible fields and a number of field values for a given field number in the hundreds. Field IDs $F(i)_f$ ($1 \leq f \leq 7$) and associated field values $V(i)_{f,v}$ are shown along an abscissa 201 of histogram 200, with field values $V(i)_{f,v}$ belonging to a particular field $F(i)_f$ grouped together by a curly bracket having a cusp pointing to the particular field. Frequencies of occurrence of field values $V(i)_{f,v}$ are shown along an ordinate 202 of the histogram in percent of times that the field values respectively occur in the fields $F(i)_f$ to which they belong. By way of example normative histogram 200 shows frequencies of occurrence for a scenario in which all the fields $F(i)_f$ are present in all successful transactions and each field may assume only one of its possible V values at a time.

Figure 2B:
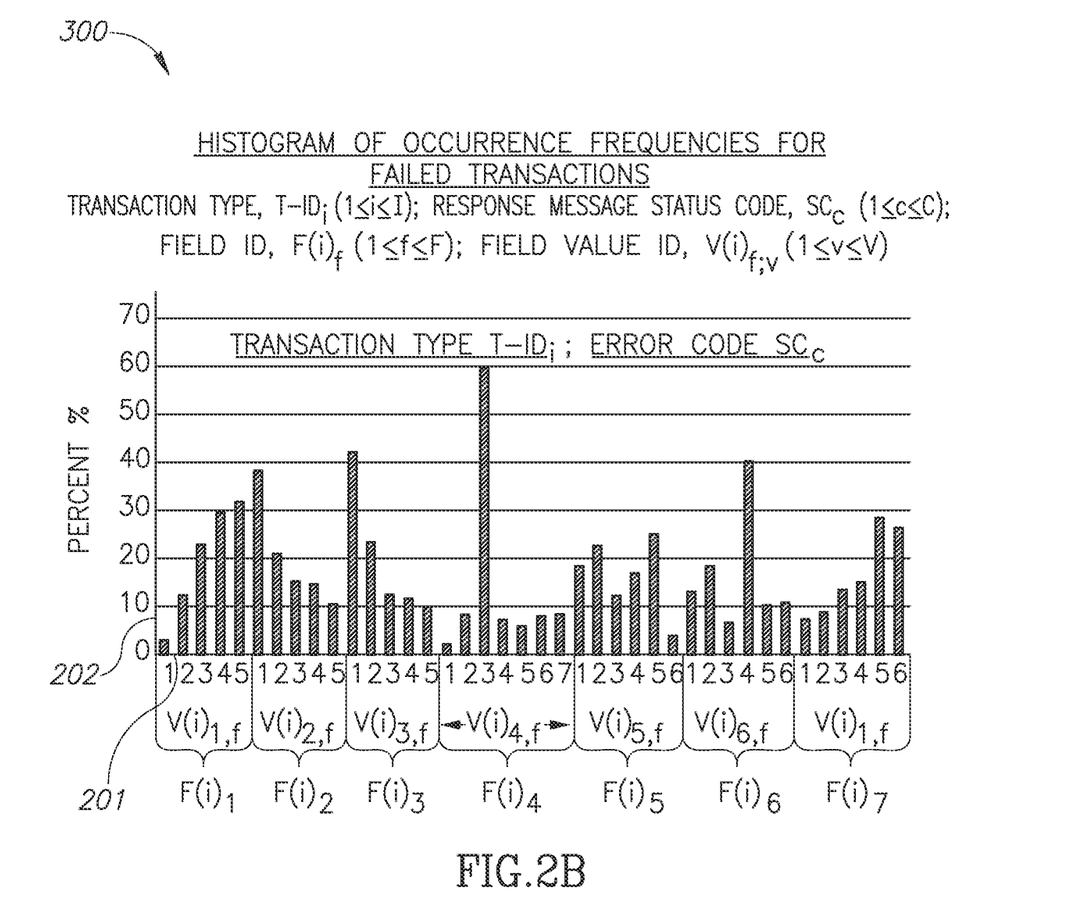
FIG. 2B schematically shows a simulated "anomalous" histogram that graphs anomalous occurrence frequencies of field values for the given transaction type and fields shown in FIG. 2A comprised in response messages of failed transactions propagated over the network, in accordance with an embodiment of the disclosure.

FIG. 2B shows a simulated anomalous histogram 300 of anomalous occurrence frequencies for failed transactions engaged in over the network for the same type transaction $T\text{-}ID_i$ and fields $F(i)_f$ that are shown in FIG. 2A but for which the protocol due the failure of the transaction has assigned an error code $SC_c$ ($1 \leq c \leq C$) identified by the subscript c of a possible C different error codes. To substantially within two standard deviations of the occurrence frequencies shown in histogram 200 shown in FIG. 2A the occurrence frequencies shown in anomalous histogram 300 are the same as those in normative histogram 200 for all the fields except for fields $F(i)_4$ and $F(i)_6$.

Figure 2C:
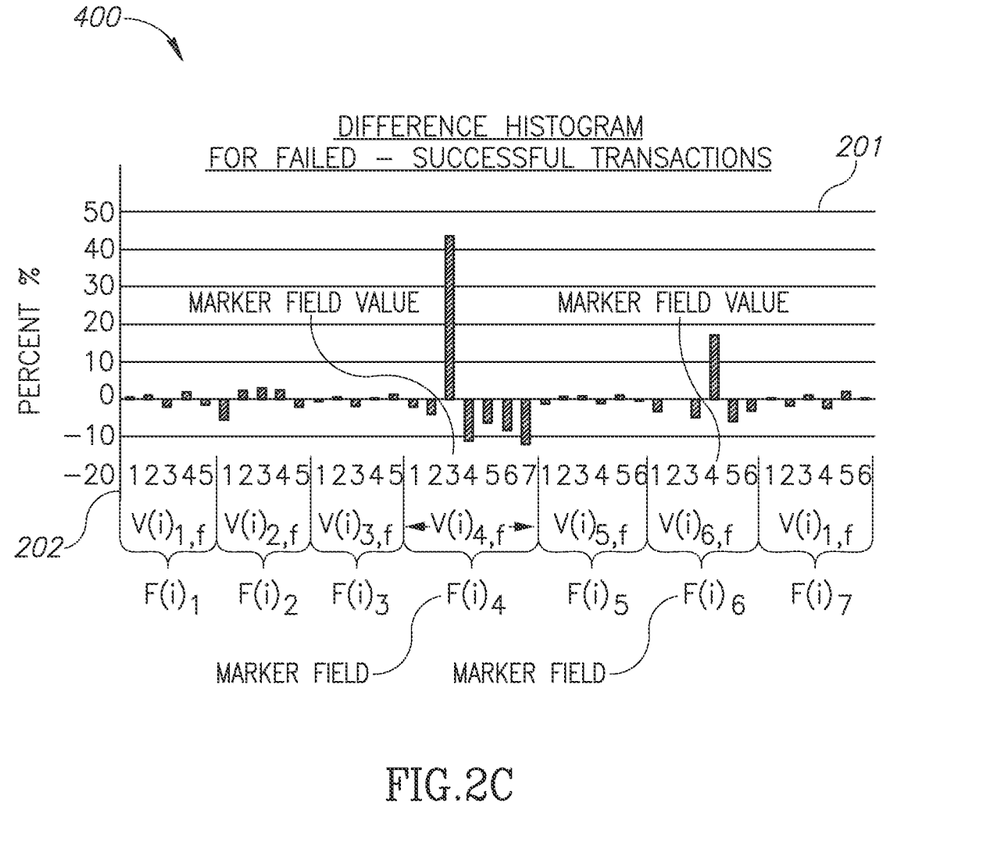
FIG. 2C schematically shows a difference histogram showing differences between the normative and anomalous histograms shown in FIGS. 2A and 2B that indicate marker fields and marker field values, in accordance with an embodiment of the disclosure.

Whereas differences exhibited between occurrence frequencies for field values $V(i)_{f,v}$ in fields $F(i)_4$ and $F(i)_6$ of normative histogram 200 and field values $V(i)_{f,v}$ in fields $F(i)_4$ and $F(i)_6$ respectively of anomalous histogram 300 are not easily be recognized by visual inspection of histograms 200 and 300 the differences stand out in a difference histogram 400 shown in FIG. 2C.

Histogram 400 in FIG. 2C graphs the occurrence frequencies of field values $V(i)_{f,v}$ in anomalous histogram 300 minus the occurrence frequencies in corresponding field values $V(i)_{f,v}$ in histogram 200. Differences for all the fields except fields $F(i)_4$ and $F(i)_6$ are random and statistically insignificant relative to assumed standard deviations of the relative occurrence frequencies. The differences for fields $F(i)_4$ and $F(i)_6$ are prominent and in particular the differences for field values $V(i)_{4,3}$ and $V(i)_{6,4}$ are prominent and statistically significant. In accordance with an embodiment of the disclosure $F(i)_4$ and $F(i)_6$ may be considered marker fields and field values $V(i)_{4,3}$ and $V(i)_{6,4}$ marker field values useable to determine a root or root causes of failure for transactions $T\text{-}ID_i$ configured in accordance with the given protocol that are tagged with error code c by the protocol.

Figure 3A:
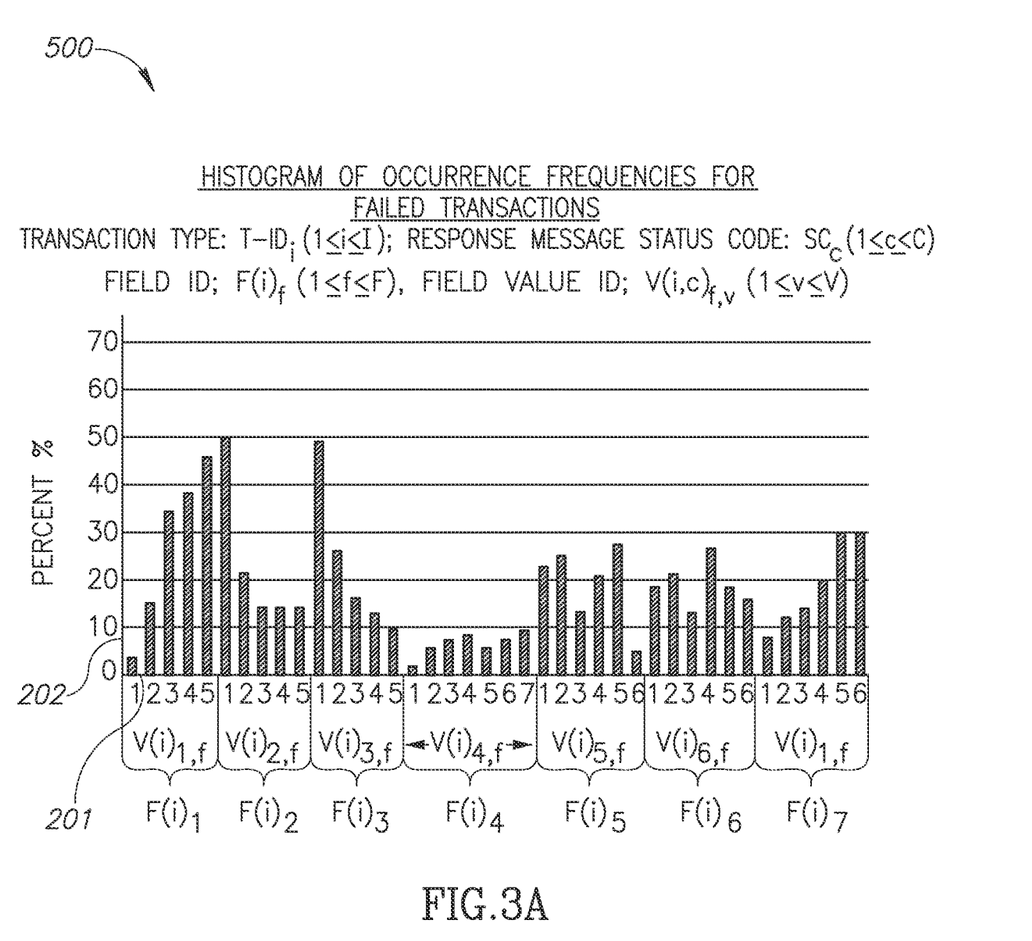
FIG. 3A schematically shows another simulated "anomalous" histogram that graphs anomalous occurrence frequencies of field values for the given transaction type and fields shown in FIG. 2A comprised in response messages of failed transactions propagated over the network, in accordance with an embodiment of the disclosure.
Figure 3B:
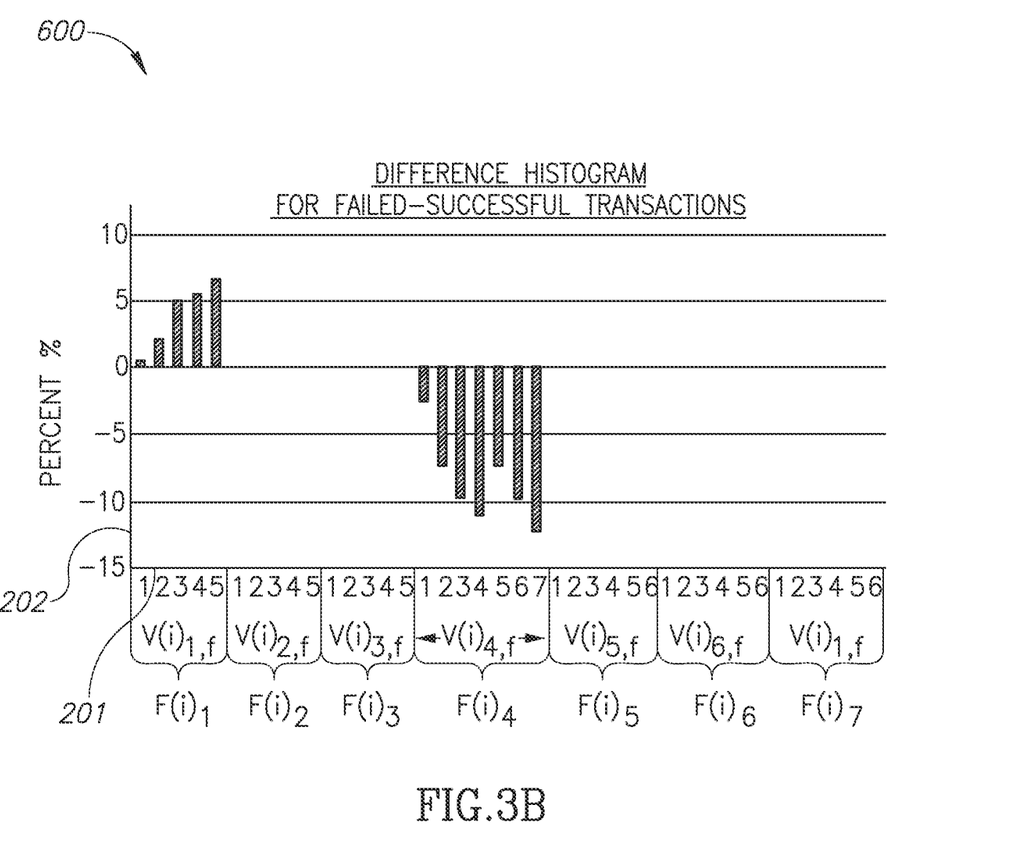
FIG. 3B schematically shows a difference histogram showing differences between the normative and anomalous histograms shown in FIGS. 2A and 3A that indicate marker fields, in accordance with an embodiment of the disclosure.
Figure 3C:
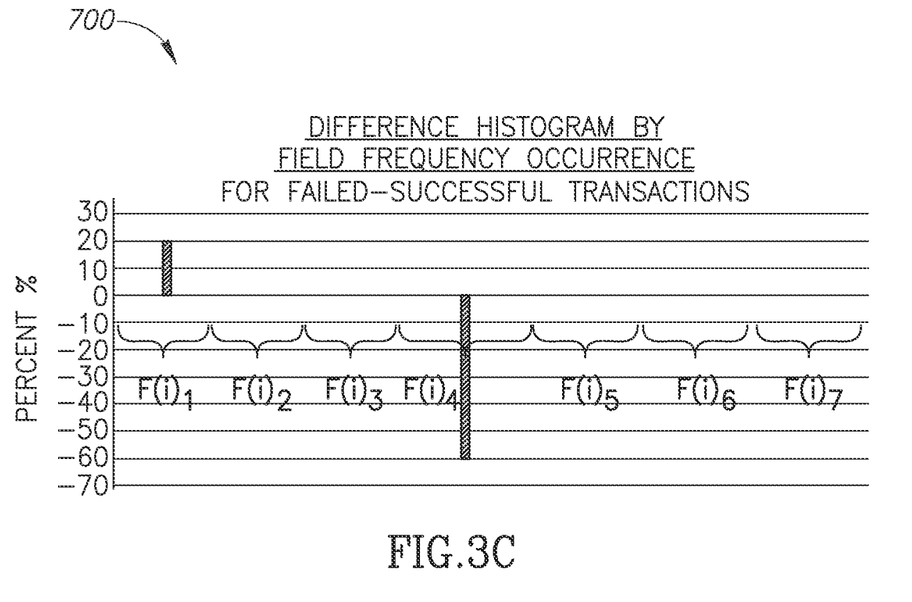
FIG. 3C schematically shows a difference histogram that graphs differences between the normative and anomalous histograms shown in FIGS. 2A and 3A by fields, in accordance with an embodiment of the disclosure.

FIG. 3A schematically shows a simulated anomalous histogram 500 of occurrence frequencies for field values $V(i)_{f,v}$ of fields $F(i)_f$ for a scenario in which failed transactions appear to be characterized by an anomalous excess presence of field values in field $F(i)_1$ or an anomalous absence of field values in field $F(i)_4$. A difference histogram 600 in FIG. 3B graphs the occurrence frequencies of field values $V(i)_{f,v}$ in anomalous histogram 500 minus the occurrence frequencies in corresponding field values $V(i)_{f,v}$ in normative histogram 200. The difference graph clearly distinguishes an anomalous excess frequency of field values in field $F(i)_1$ or an anomalous absence of field values in field $F(i)_4$ as characteristic of failed transactions. A difference histogram 700 graphs the occurrence frequencies of fields $F(i)_f$ in anomalous histogram 500 minus the occurrence frequencies in corresponding field in normative histogram 200. Difference histogram 700 shows that field $F(i)_1$ occurs about 20% more frequently in failed transactions than in successful transactions and that field $F(i)_4$ occurs less frequently in failed transactions by about 60% than in successful transactions.

It is noted that difference histograms 600 and 700 does not distinguish whether or not excess presence and undue absence of field values are correlated or not. In an embodiment ROCAUS is configured to process occurrence frequencies of field values to determine whether anomalies in the occurrence frequencies are correlated.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of identifying features characterizing failed transactions engaged in via a communications network, the method comprising:
   determining occurrence frequencies of fields and/or field values exhibited by the fields in successful transaction messages engaged in via the network;
   determining occurrence frequencies of fields and/or field values exhibited by the fields in messages of failed transactions engaged in via the network; and
   processing the occurrence frequencies to determine marker occurrence frequencies characterizing the failed transactions.

2. The method according to claim 1 wherein determining the marker occurrence frequencies comprises determining marker occurrence frequencies of fields and/or field values that appear in messages of the transactions that are configured in accordance with a same communications protocol.

3. The method according to claim 2 wherein the same communications protocol is a fixed or mobile network protocol such as a 5G Core, LTE/EPC, IMS, or an application layer protocol.

4. The method according to claim 1 wherein determining the marker occurrence frequencies comprises determining marker occurrence frequencies of fields and/or field values that appear in messages of the transactions that are configured in accordance with a same type of transaction.

5. The method according to claim 1 wherein determining marker occurrence frequencies comprises determining marker occurrence frequencies of fields and/or field values that appear in messages of the failed transactions that share a same error code.

6. The method according to claim 1 wherein determining an occurrence frequency for a field value comprises determining an occurrence frequency for a range of field values to which the field value belongs.

7. The method according to claim 1 wherein determining that an occurrence frequency for a field or a field value in the messages exhibited in the transactions is a marker occurrence frequency comprises determining whether a difference between the occurrence frequency for the field or field value in the failed transactions and the occurrence frequency for the respective field or field value in the successful transactions is statistically significant.

8. The method according to claim 7 wherein the difference is determined to be statistically significant if the difference is greater than or equal to a sum of a standard deviation of the occurrence frequency for the successful transactions and a standard deviation of the occurrence frequency for the failed transactions.

9. The method according to claim 7 wherein the difference is determined to be statistically significant if the difference is greater than or equal to a sum of twice a standard deviation of the occurrence frequency for the successful transactions and twice a standard deviation of the occurrence frequency for the failed transactions.

10. The method according to claim 1 wherein the messages comprise request messages.

11. The method according to claim 1 wherein the messages comprise response messages.

12. The method according to claim 1 and determining fields and field values that exhibit the marker occurrence frequencies to be marker fields and marker field values respectively.

13. The method according to claim 12 and comprising using a marker field and/or a marker field value to determine a root cause of a failed transaction engaged in via the network.

14. An apparatus comprising processing and memory resources having computer executable instructions executable to:
   determine occurrence frequencies of fields and/or field values exhibited by the fields in successful transaction messages engaged in via the network;
   determine occurrence frequencies of fields and/or field values exhibited by the fields in messages of failed transactions engaged in via the network; and
   process the occurrence frequencies to determine marker occurrence frequencies characterizing the failed transactions.

15. The apparatus according to claim 14 wherein determining the marker occurrence frequencies comprises determining marker occurrence frequencies of fields and/or field values that appear in messages of the transactions that are configured in accordance with a same communications protocol.

16. The apparatus according to claim 15 wherein the same communications protocol is a fixed or mobile network protocol such as a 5G Core, LTE/EPC, IMS, or an application layer protocol.

17. The apparatus according to claim 14 wherein determining the marker occurrence frequencies comprises determining marker occurrence frequencies of fields and/or field values that appear in messages of the transactions that are configured in accordance with a same type of transaction.

18. The apparatus according to claim 14 wherein determining marker occurrence frequencies comprises determining marker occurrence frequencies of fields and/or field values that appear in messages of the failed transactions that share a same error code.

19. The apparatus according to claim 14 wherein determining an occurrence frequency for a field value comprises determining an occurrence frequency for a range of field values to which the field value belongs.

20. The apparatus according to claim 14 wherein determining that an occurrence frequency for a field or a field value in the messages exhibited in the transactions is a marker occurrence frequency comprises determining whether a difference between the occurrence frequency for the field or field value in the failed transactions and the occurrence frequency for the respective field or field value in the successful transactions is statistically significant.

* * * * *